United States Patent
Nakano

(10) Patent No.: US 9,126,762 B2
(45) Date of Patent: Sep. 8, 2015

(54) RUBBER COMPOSITION FOR CONVEYOR BELTS AND CONVEYOR BELT

(71) Applicant: BRIDGESTONE CORPORATION, Chuo-ku, Tokyo (JP)

(72) Inventor: Hiroki Nakano, Yokohama (JP)

(73) Assignee: BRIDGESTONE CORPORATION, Tokyo (JP)

(*) Notice: Subject to any disclaimer, the term of this patent is extended or adjusted under 35 U.S.C. 154(b) by 0 days.

(21) Appl. No.: 14/364,093

(22) PCT Filed: Dec. 14, 2012

(86) PCT No.: PCT/JP2012/008028
§ 371 (c)(1),
(2) Date: Jun. 10, 2014

(87) PCT Pub. No.: WO2013/088743
PCT Pub. Date: Jun. 20, 2013

(65) Prior Publication Data
US 2014/0353129 A1  Dec. 4, 2014

(30) Foreign Application Priority Data

Dec. 16, 2011 (JP) ................ 2011-275768

(51) Int. Cl.
*C09B 67/00* (2006.01)
*C08L 9/00* (2006.01)
*B65G 15/32* (2006.01)
*C08L 7/00* (2006.01)
*C08K 7/14* (2006.01)

(52) U.S. Cl.
CPC . *B65G 15/32* (2013.01); *C08K 7/14* (2013.01); *C08L 7/00* (2013.01)

(58) Field of Classification Search
CPC .................. B65G 15/32; C08L 7/00
USPC ....................................... 524/502
See application file for complete search history.

(56) References Cited

U.S. PATENT DOCUMENTS

| 4,972,022 A | 11/1990 | Kondo et al. |
| 2003/0040592 A1 | 2/2003 | Tajima et al. |
| 2008/0009570 A1* | 1/2008 | Miyazaki ............. 524/89 |

FOREIGN PATENT DOCUMENTS

| CN | 101100532 A | 1/2008 |
| CN | 101522779 A | 9/2009 |
| JP | 61-151249 A | 7/1986 |
| JP | 64-40543 A | 2/1989 |
| JP | 7-102121 A | 4/1995 |
| JP | 2000-198518 A | 7/2000 |
| JP | 2003-20328 A | 1/2003 |
| JP | 2006-199892 A | 8/2006 |
| JP | 2006-307079 A | 11/2006 |
| JP | 2006-348222 A | 12/2006 |
| JP | 2008-31427 A | 2/2008 |
| JP | 2009-215339 A | 9/2009 |
| JP | 2009215339 A * | 9/2009 |
| JP | 2011-168712 A | 9/2011 |

OTHER PUBLICATIONS

UBE BR 150B data sheet, Feb. 15, 2015.*
ZEON SBR Nipol 1502 product sheet, Feb. 15, 2015.*
Communication from the Australian Patent Office issued Sep. 10, 2014 in corresponding Australian Application No. 2012353896.
International Search Report of PCT/JP2012/008028, dated Jan. 29, 2013.
First Office Action issued Jan. 29, 2015 in corresponding Chinese Patent Application No. 201280062225.9 with translation.

* cited by examiner

*Primary Examiner* — Hui Chin
(74) *Attorney, Agent, or Firm* — Sughrue Mion, PLLC

(57) ABSTRACT

The present invention relates to a rubber composition for a conveyor belt that enables the provision of a conveyor belt having sufficiently good tensile strength, tear resistance, abrasion resistance, and cut resistance and, more specifically, to a rubber composition for a conveyor belt that contains, with respect to 100 parts by mass of a rubber component containing 40 to 70 mass % of natural rubber, 10 to 25 mass % of styrene butadiene rubber, and 15 to 35 mass % of butadiene rubber, 1 to 5 parts by mass of a resin component.

5 Claims, No Drawings

RUBBER COMPOSITION FOR CONVEYOR BELTS AND CONVEYOR BELT

CROSS REFERENCE TO RELATED APPLICATIONS

This application is a National Stage of International Application No. PCT/JP2012/008028filed Dec. 14, 2012, claiming priority based on Japanese Patent Application No. 2011-275768, filed Dec. 16, 2011, the contents of all which are incorporate herein by reference in their entirety.

TECHNICAL FIELD

The present invention relates to a rubber composition for a conveyor belt and the conveyor belt, and more specifically, to a rubber composition for the conveyor belt that enables the provision of a conveyor belt having sufficiently good tensile strength, tear resistance, abrasion resistance, and cut resistance.

BACKGROUND ART

In iron, coal and cement industrial fields, a conveyor belt has been popularly used as a means of transporting goods. Such a conveyor belt is required to have, depending on its usage, oil resistance, heat resistance, chemical resistance, and nontoxicity and, further, high durability to withstand friction with goods being transported and their weight. In order to provide the durability to the conveyor belt, the conveyor belt is manufactured generally by using a reinforcing member such as a metal member such as a steel cord and the like or canvas made of aramid fiber and the like as a core material, to which a cover rubber is bonded in such a manner as to cover the reinforcing member, and then by volcanizing the core material together with the cover rubber. The cover rubber is used for the purpose of protecting the core material of the belt, and a life of the cover rubber may be considered as a life of the conveyor belt. In recent years, a size of the conveyor belt has been increasing, and a demand for improved durability of the cover rubber of the conveyor belt has been increasing more and more in those industrial fields.

In order to meet such a demand, there has been suggested a rubber composition for the cover rubber of the conveyor belt containing predetermined particulate carbon black and having good breaking strength, elongation, and abrasion resistance (JP-A-2000-198518). Also, there has been suggested rubber for a conveyor belt cover that contains carbon black and resin and achieves both the abrasion resistance and the cut resistance (impact resistance) (JP-A-2006-199892). However, obtaining the rubber composition that imparts good properties of all of the tensile strength, the tear resistance, the abrasion resistance, and the cut resistance to the conveyor belt has been difficult for the reason that those properties conflict with each other.

As such, the applicant has suggested a rubber composition for the conveyor belt containing, with respect to a rubber composition containing 75 to 85 mass % of natural rubber and 15 to 25 mass % of butadiene rubber, a predetermined amount of a resin composition and a vulcanizing agent (JP-A-2009-215339). However, a rubber composition for a conveyor belt that achieves balancing the tensile strength, the tear resistance, the abrasion resistance, and the cut resistance of the conveyor belt at a higher level has been desired.

RELATED ART DOCUMENTS

Patent Documents

Patent Document 1: Japanese Patent Application Laid-Open Publication No. 2000-198518
Patent Document 2: Japanese Patent Application Laid-Open Publication No. 2006-199892
Patent Document 3: Japanese Patent Application Laid-Open Publication No. 2009-215339

SUMMARY OF INVENTION

Technical Problem

An object of the present invention is to provide a rubber composition for the conveyor belt that enables the provision of a conveyor belt having sufficiently good tensile strength, tear resistance, abrasion resistance, and cut resistance, and also to provide a conveyor belt having the sufficiently good tensile strength, tear resistance, wear resistance, and cut resistance.

Solution to Problem

The inventor, as a result of diligent studies to achieve the above object, has found that using a rubber composition containing a particular amount of each of natural rubber, styrene butadiene rubber, butadiene rubber and a resin component enables balancing tensile strength, tear resistance, abrasion resistance, and cut resistance on a high level, and thus accomplished the present invention.

That is, the rubber composition for the conveyor belt according to the present invention is characterized in containing, with respect to 100 parts by mass of a rubber component containing 40 to 70 mass % of natural rubber, 10 to 25 mass % of styrene butadiene rubber, and 15 to 35 mass % of butadiene rubber, 1 to 5 parts by mass of the resin component.

Effect of the Invention

According to the present invention, a rubber composition for a conveyor belt that enables the provision of a conveyor belt having sufficiently good tensile strength, tear resistance, abrasion resistance, and cut resistance, and also a conveyor belt having sufficiently good tensile strength, tear resistance, abrasion resistance, and cut resistance may be provided.

DESCRIPTION OF EMBODIMENT

Hereinafter, the present invention will be described in detail. A rubber composition for a conveyor belt according to the present invention is characterized in containing, with respect to 100 parts by mass of a rubber component containing 40 to 70 mass % of natural rubber, 10 to 25 mass % of styrene butadiene rubber, and 15 to 35 mass % of butadiene rubber, 1 to 5 parts by mass of a resin component.

(Rubber Component)

A rubber component contained in the rubber composition for the conveyor belt according to the present invention contains natural rubber (NR), styrene butadiene rubber (SBR), and butadiene rubber (BR). Synthetic rubbers may be used in addition to the above rubber component. Such synthetic rubbers are not particularly limited as long as being commonly used and may be, in particular, isoprene rubber (IR), chloroprene rubber, ethylene propylene diene rubber (EPDM), halogenated butyl rubber, and acrylonitrile butadiene rubber.

In the above rubber component, an amount of the natural rubber is 40 to 70 mass %, preferably 50 to 65 mass %. When the amount of the natural rubber is less than 40 mass %, the tensile strength and the tear resistance deteriorate. On the other hand, the amount of the natural rubber exceeding 70 mass % leads to deterioration in the abrasion resistance.

As the styrene butadiene rubber, emulsion polymerization SBR (E-SBR), solution polymerization SBR (S-SBR), and the like may be used. According to the present invention, the amount of the styrene butadiene rubber contained in the rubber component is 10 to 25 mass %, preferably 15 to 25 mass %. When the amount of the styrene butadiene rubber is less than 10 mass %, the tear resistance, the abrasion resistance and the cut resistance deteriorate. On the other hand, the amount of the styrene butadiene rubber exceeding 25 mass % leads to deterioration in the tensile strength. The styrene content in the styrene butadiene rubber is preferably, but not particularly limited to, 20 to 40 mass %, more preferably 20 to 30 mass % from the viewpoint of the tensile strength, the tear resistance, the abrasion resistance and the cut resistance. Also, Mooney viscosity of the styrene butadiene rubber at 100° C. is preferably in a range of 40 to 60 from the viewpoint of workability.

Butadiene rubber may be used regardless of cis-1,4 bond content. However, the cis-1,4 bond content is preferably no less than 90%, more preferably no less than 95%. When the cis-1,4 bond content is 95% or more, a conveyor belt with better abrasion resistance may be obtained. Such high cis-butadiene rubber may be produced by using titanium-based catalysts, cobalt-based catalysts, nickel-based catalysts, and neodymium based catalysts. The rubber composition of the present invention contains, in the rubber component, 15 to 35 mass % of butadiene rubber, preferably 20 to 30 mass %. When the amount of the butadiene rubber is less than 15 mass %, the abrasion resistance deteriorate. On the other hand, the amount of the butadiene rubber exceeding 35 mass % leads to deterioration in the tensile strength, the tear resistance, and the cut strength. Also, the Mooney viscosity of the butadiene rubber at 100° C. is preferably in a range of 40 to 50 from the viewpoint of the workability. Further, a molecular weight distribution of the butadiene rubber ($M_w/M_n$) is preferably no more than 3.0. When the molecular weight distribution of the butadiene rubber exceeds 3.0, molecular weight of the butadiene molecules constituting the butadiene rubber is distributed in a wide range, possibly deteriorating either the abrasion resistance due to an increase in the butadiene with low molecular weight or the workability due to an increase in the butadiene with high molecular weight.

Also, in the rubber composition for the conveyor belt according to the present invention, an absolute value of a difference between the Mooney viscosity of the styrene butadiene rubber and the Mooney viscosity of the butadiene rubber both at 100° C. is preferably no more than 20 from the viewpoint of the workability, and more preferably no more than 10. When the absolute value of the difference between the Mooney viscosities exceeds 20, the rubber component may not be uniformly dispersed during processing and expected performance may not be obtained.

(Resin Component)

The resin component is blended for the purpose of improvement in physical properties of the conveyor belt and may be, in particular, rosin resin, coumarone resin, coumarone-indene resin, phenol resin, lignin, modified melamine resin, petroleum hydrocarbon resin (aromatic hydrocarbon resin, aliphatic hydrocarbon resin), aromatic polycarboxylic acid-aliphatic polyhydric alcohol condensation product, and the like. Among them, from the viewpoint of compatibility with polymer and an improvement in the physical properties by addition thereof, dicyclopentadiene resin (DCPD) is preferred. Dicyclopentadiene resin even in a small quantity may effectively improve the tear resistance and the cut resistance of the conveyor belt. Dicyclopentadiene resin is a resin obtained by polymerization of dicyclopentadiene using Friedel-Crafts catalyst such as $AlCl_3$ and $BF_3$. The rubber composition of the present invention, with respect to 100 parts by mass of the rubber component, contains 1 to 5 parts by mass of the resin component, preferably 1.5 to 3 parts by mass. When the amount of the resin component is less than 1 part by mass with respect to 100 parts by mass of the rubber component, the tensile strength deteriorates. On the other hand, the amount of the resin component exceeding 5 parts by mass leads to deterioration in the tensile strength and the abrasion resistance. Note that, from the viewpoint of workability, oil is preferably added to the rubber composition. However, since addition of the oil may possibly cause deterioration in the tear resistance, it is preferable to refrain from adding the oil according to the present invention. The above resin component also has a function to improve the workability in place of the oil.

To the rubber composition for the conveyor belt according to the present invention, additives other than the above components may be appropriately blended. Such additives may be, for example, vulcanizing agents, vulcanization accelerators or vulcanization accelerator aids, reinforcing fillers such as carbon black, silica and the like, inorganic fillers such as calcium carbonate, clay and the like, age resisters, plasticizers, waxes, antioxidants, lubricants, ultraviolet absorbers, dispersing agents, compatibilizing agents, homogenizing agents, and the like. The rubber composition for the conveyor belt according to the present invention may be produced by, for example, kneading the above components with a Banbury mixer, a kneader or the like.

The conveyor belt of the present invention may be manufactured by closely adhering the rubber composition for the conveyor belt described above to a reinforcing member and then volcanizing the rubber composition together with the reinforcing member. For example, a cover rubber layer in the form of a sheet is produced by extrusion molding of the rubber composition for the conveyor belt described above, which then vertically sandwiches the reinforcing member, and thus obtained belt molding is set in a mold and subjected to vulcanization at predetermined temperature under predetermined pressure for a predetermined time. Since ores, rocks and other goods being conveyed that become a major cause of abrasion and the like come into contact with an upper cover rubber layer, using the rubber composition of the present invention for the upper cover rubber layer alone may sufficiently improve durability of the conveyor belt of the present invention. However, it is needless to say that the rubber composition of the present invention may be used for a lower covering layer alone.

As the reinforcing member described above, one that is commonly used for the conveyor belt may be appropriately selected considering the application and a size of the conveyor belt. In particular, zinc-plated steel cord, brass-plated steel cord, aramid canvas using aramid fibers, and the like may be mentioned. According to the present invention, using any one of those reinforcing members enables the obtainment of a conveyor belt having sufficiently good tensile strength, tear resistance, abrasion resistance and cut resistance.

EXAMPLES

Hereinafter, the present invention will be described in detail with reference to Examples, although the present invention is not limited thereto. Note that the Mooney viscosities ($ML_{1+4}/100°$ C.) of the styrene butadiene rubber and the butadiene rubber at 100° C. were measured by using an RLM-01 type tester (Toyoseiki Kogyo Co., Ltd.). The molecular weight distribution of the butadiene rubber ($M_w/M_n$) was calculated by using a gel permeation chromatography (GPC) on the basis of a polystyrene standard sample.

Examples 1 to 10, Comparative Examples 1 to 11

The rubber compositions containing components as shown in Table 1 and Table 2 were prepared in a usual manner. Obtained unvulcanized rubber compositions were appropriately subjected to vulcanization molding and, by using methods described below, the tensile strength, the tear resistance, the abrasion resistance, and the cut resistance thereof were evaluated.

<Evaluation Method>
Tensile Strength
The tensile strength was measured according to DIN53504. Results of the evaluation are shown as indices with respect to a value of the tensile strength of the rubber composition of Comparative Example 1 set to 100 in Table 1 and Table 2. The larger the index is, the better the tensile strength is.

Tear Resistance
The tear resistance was measured according to DIN53507. Results of the evaluation are shown as indices with respect to a value of the tear resistance of the rubber composition of Comparative Example 1 set to 100 in Table 1 and Table 2. The larger the index is, the better the tear resistance is.

Abrasion Resistance (DIN Abrasion Test)
The abrasion resistance was measured according to DIN53516 by using a DIN abrasion tester. The test was conducted at room temperature and a wear amount ($mm^3$) was measured. Results of the evaluation are shown as indices with respect to a reciprocal of a value of the abrasion resistance of the rubber composition of Comparative Example 1 set to 100 in Table 1 and Table 2. The larger the index is, the better the abrasion resistance is.

Cut Resistance (Weight-Dropping Cut Test)
A rubber block of 60 mm long, 70 mm wide and 30 mm high was vulcanized and cured under a condition of 155° C. for 45 minutes, and thus an evaluation body was obtained. At room temperature, a sharp blade with an edge at 60 degrees having a weight of 15 kg was dropped from a height of 40 cm to the evaluation body, and a depth (mm) of a crack caused in the evaluation body was measured. Results of the evaluation are shown as indices with respect to a reciprocal of a value of the cut resistance of the rubber composition of Comparative Example 1 set to 100 in Table 1 and Table 2. The larger the index is, the better the cut resistance is.

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Composition (parts by mass) | NR *1 | 40 | 65 | 70 | 60 | 60 | 50 | 65 | 65 | 65 | 65 |
| | SBR *2 | 25 | 15 | 15 | 10 | 25 | 15 | 15 | 15 | 15 | 15 |
| | BR *3 | 35 | 20 | 15 | 30 | 15 | 35 | 20 | 20 | 20 | 20 |
| | Carbon black *4 | 50 | 50 | 50 | 50 | 50 | 50 | 50 | 50 | 50 | 50 |
| | Stearic acid *5 | 1 | 1 | 1 | 1 | 1 | 1 | 1 | 1 | 1 | 1 |
| | Zinc oxide *6 | 3 | 3 | 3 | 3 | 3 | 3 | 3 | 3 | 3 | 3 |
| | Wax *7 | 3 | 3 | 3 | 3 | 3 | 3 | 3 | 3 | 3 | 3 |
| | Age resister *8 | 3 | 3 | 3 | 3 | 3 | 3 | 3 | 3 | 3 | 3 |
| | DCPD *9 | 1.5 | 1.5 | 1.5 | 1.5 | 1.5 | 1.5 | 1 | 3 | 5 | 0 |
| | Rosin *10 | 0 | 0 | 0 | 0 | 0 | 0 | 0 | 0 | 0 | 1.5 |
| | Sulfur *11 | 2 | 2 | 2 | 2 | 2 | 2 | 2 | 2 | 2 | 2 |
| | Vulcanization accelerator *12 | 1 | 1 | 1 | 1 | 1 | 1 | 1 | 1 | 1 | 1 |
| Evaluation (Index) | Tensile strength | 110 | 128 | 133 | 118 | 120 | 112 | 127 | 125 | 120 | 120 |
| | Tear resistance | 105 | 112 | 118 | 109 | 110 | 105 | 110 | 123 | 121 | 108 |
| | Abrasion resistance | 105 | 100 | 100 | 102 | 100 | 110 | 103 | 102 | 100 | 100 |
| | Cut resistance | 100 | 101 | 105 | 100 | 110 | 98 | 100 | 110 | 110 | 100 |

TABLE 2

| | | Comparative Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Composition (parts by mass) | NR *1 | 30 | 80 | 70 | 40 | 65 | 40 | 65 | 65 | 80 | 60 | 75 |
| | SBR *2 | 40 | 10 | 5 | 30 | 25 | 20 | 15 | 15 | 0 | 30 | 10 |
| | BR *3 | 30 | 10 | 25 | 30 | 10 | 40 | 20 | 20 | 20 | 10 | 15 |
| | Carbon black *4 | 50 | 50 | 50 | 50 | 50 | 50 | 50 | 50 | 50 | 50 | 50 |
| | Stearic acid *5 | 1 | 1 | 1 | 1 | 1 | 1 | 1 | 1 | 1 | 1 | 1 |
| | Zinc oxide *6 | 3 | 3 | 3 | 3 | 3 | 3 | 3 | 3 | 3 | 3 | 3 |
| | Wax *7 | 3 | 3 | 3 | 3 | 3 | 3 | 3 | 3 | 3 | 3 | 3 |
| | Age resister *8 | 3 | 3 | 3 | 3 | 3 | 3 | 3 | 3 | 3 | 3 | 3 |
| | DCPD *9 | 1.5 | 1.5 | 1.5 | 1.5 | 1.5 | 1.5 | 0 | 8 | 1.5 | 3 | 3 |
| | Rosin *10 | 0 | 0 | 0 | 0 | 0 | 0 | 0 | 0 | 0 | 0 | 0 |
| | Sulfur *11 | 2 | 2 | 2 | 2 | 2 | 2 | 2 | 2 | 2 | 2 | 2 |
| | Vulcanization accelerator *12 | 1 | 1 | 1 | 1 | 1 | 1 | 1 | 1 | 1 | 1 | 1 |

TABLE 2-continued

|  |  | Comparative Examples | | | | | | | | | | |
| --- | --- | --- | --- | --- | --- | --- | --- | --- | --- | --- | --- | --- |
|  |  | 1 | 2 | 3 | 4 | 5 | 6 | 7 | 8 | 9 | 10 | 11 |
| Evaluation (Index) | Tensile strength | 100 | 130 | 120 | 102 | 110 | 94 | 95 | 90 | 122 | 121 | 128 |
|  | Tear resistance | 100 | 110 | 95 | 101 | 115 | 87 | 102 | 117 | 89 | 119 | 97 |
|  | Abrasion resistance | 100 | 85 | 93 | 95 | 82 | 108 | 100 | 93 | 90 | 85 | 92 |
|  | Cut resistance | 100 | 95 | 92 | 100 | 102 | 86 | 97 | 115 | 89 | 118 | 96 |

*1 Natural rubber, RSS size 3
*2 Produced by JSR Corporation, SBR 1500, styrene content 23.5 mass %, Mooney viscosity (100° C.) of 49
*3 Produced by JSR Corporation, JSR T0700, Nd as catalyst, methylaluminoxane as co-catalyst, Mooney viscosity (100° C.) of 43, $M_w/M_n$ 2.5
*4 Produced by Tokai Carbon Co., Ltd., ISAF grade carbon black, Seast ® 6
*5 Produced by New Japan Chemical Co., Ltd., stearic acid
*6 Produced by Toho Zinc Co., Ltd., zinc oxide
*7 Produced by Ouchi Shinko Chemical Industrial Co., Ltd., Sunnoc W
*8 Produced by Ouchi Shinko Chemical Industrial Co., Ltd., Nocrac 6C
*9 Produced by Shin Nippon Oil Chemical Co., Ltd., Nisseki NeoResin
*10 Produced by Taishamatsu essential oil Co., Ltd., Highrosin S
*11 Produced by Tsurumi Chemical Industry Co., Ltd., common sulfur
*12 Produced by Ouchi Shinko Chemical Industrial Co., Ltd., Noccelar-NS-F As is apparent from the results shown in Table 1 and Table 2, Examples 1 to 10 where the rubber composition containing, with respect to 100 parts by mass of the rubber component containing 40 to 70 mass % of NR, 10 to 25 mass % of SBR, and 15 to 35 mass % of BR, 1 to 5 mass % of the resin component show excellent values of all of the tensile strength, the tear resistance, the abrasion resistance, and the cut resistance in a well-balanced manner compared with Comparative Examples, and thus the effect of the present invention was confirmed.

On the other hand, Comparative Example 1 has poor tensile strength and tear resistance due to lack of NR. Comparative Example 2 has poor abrasion resistance and cut resistance due to too much NR. Comparative Example 3 has poor tear resistance, abrasion resistance and cut resistance due to lack of SBR. Comparative Example 4 has poor tensile strength due to too much SBR. Comparative Example 5 has poor abrasion resistance due to lack of BR. Comparative Example 6 has poor tensile strength, tear resistance and cut resistance due to too much BR. Comparative Example 7 has poor tensile strength doe to absence of DCPD. Comparative Example 8 has poor tensile strength and abrasion resistance due to too much DCPD. Comparative Example 9 has poor tear resistance, abrasion resistance and cut resistance due to absence of SBR. Comparative Example 10 has poor abrasion resistance due to lack of BR. Comparative Example 11 has poor abrasion resistance and cut resistance due to too much NR.

The invention claimed is:

1. A rubber composition for a conveyor belt containing, with respect to 100 parts by mass of a rubber component containing 40 to 70 mass % of natural rubber, 10 to 25 mass % of styrene butadiene rubber, and 15 to 35 mass % of butadiene rubber, 1 to 5 parts by mass of dicyclopentadiene resin.

2. The rubber composition for the conveyor belt according to claim 1, wherein Mooney viscosity of the styrene butadiene rubber at 100° C. is 40 to 60, and the Mooney viscosity of the butadiene rubber at 100° C. is 40 to 50.

3. The rubber composition for the conveyor belt according to claim 2, wherein an absolute value of a difference between the Mooney viscosity of the styrene butadiene rubber and the Mooney viscosity of the butadiene rubber at 100° C. is no more than 10.

4. The rubber composition for the conveyor belt according to claim 1, containing, with respect to 100 parts by mass of the rubber component, 1.5 to 3 parts by mass of the dicyclopentadiene resin.

5. A conveyor belt using the rubber composition for the conveyor belt according to claim 1.

* * * * *